Feb. 4, 1930.  C. J. GRAYSON  1,745,534
ELECTRIC COOKING APPARATUS
Filed Sept. 14, 1928
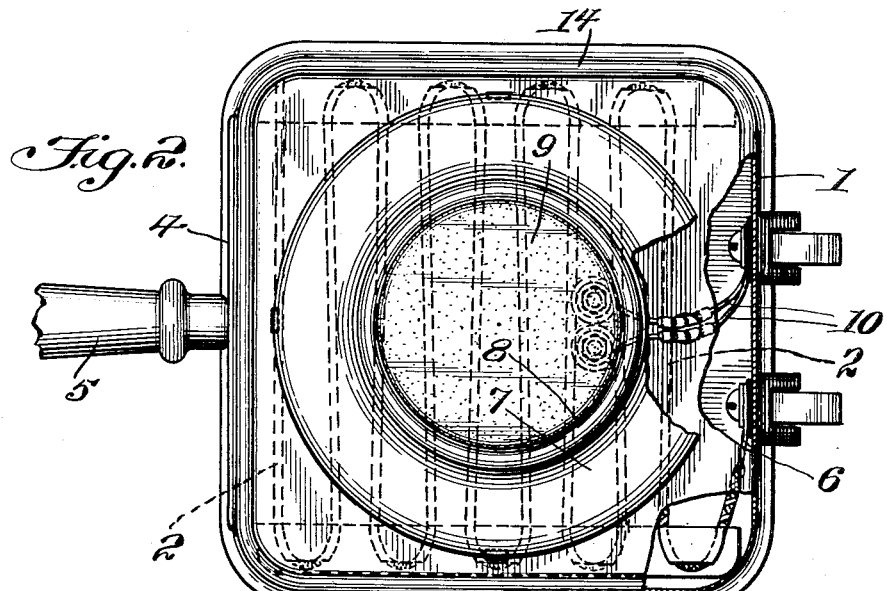
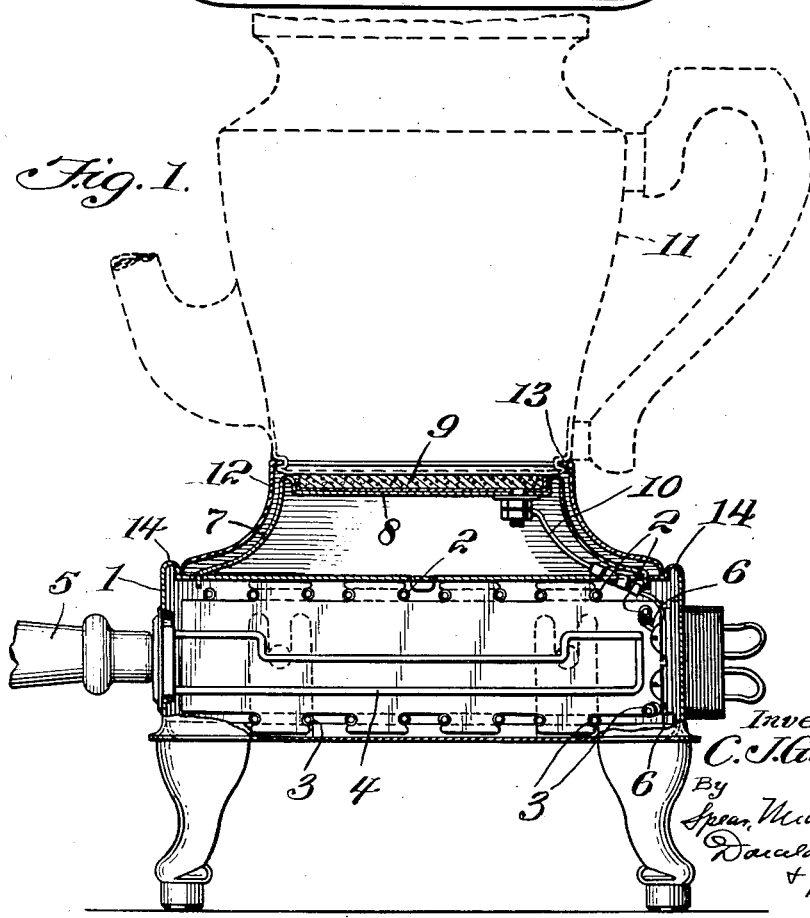

Patented Feb. 4, 1930

1,745,534

UNITED STATES PATENT OFFICE

CHARLES J. GRAYSON, OF HUNTINGTON, WEST VIRGINIA, ASSIGNOR TO THE ARMSTRONG ELECTRIC AND MANUFACTURING CORPORATION, OF HUNTINGTON, WEST VIRGINIA, A CORPORATION OF DELAWARE

ELECTRIC COOKING APPARATUS

Application filed September 14, 1928. Serial No. 306,013.

The invention relates to electric heaters for domestic use, and in one aspect it concerns a combined toaster and heater adapted to heat a percolator constructed to cooperate therewith, the latter being removable and thus giving rise to a wider use of the heating element, as for instance, in heating small quantities of milk, or other food for sick-room use in conjunction with the making of toast.

In another aspect the invention concerns a percolator and toaster combined.

The invention consists in the features and combination and arrangement of parts hereinafter described and particularly pointed out in the claims.

In the drawings:

Figure 1 is a vertical sectional view of the combined toaster and percolator heater, the percolator being indicated mainly in dotted lines.

Fig. 2 is a plan view of the stove.

In these drawings 1 indicates the toaster comprising a substantially rectangular casing having therein upper and lower heating elements 2, 3 with a space between them adapted to receive a toaster drawer or rack 4, which is provided with a handle 5 for its placement in or removal from the casing. This rack is adapted to hold the bread to be toasted. Suitable leads as 6 supply the heating element with electric current. Rising from the upper wall or top of this casing is a substantially tapering or frusto-conical support or shell 7 with a depression in its upper end at 8 in which is supported a sheathed or partly sheathed heating element 9 to which leads 10 are connected for supplying electric current.

The side of the upwardly extending shell is preferably curved inwardly to conform to the shape of the bottom portion of the percolator.

The shell 7 is connected or secured to the top of the toaster casing in any suitable way as for instance by projections on the lower edge of the shell extending through openings in the said top wall.

The percolator 11 may be of any desired form. It has a base section 12 secured to its lower end by a flange 13 entering a groove in the percolator shell. This base section has its wall flared outwardly and downwardly so that the lower edge which presents a substantially rectangular contour fits within the upstanding rib or bead 14 formed around the edge of the base member or casing of the toaster unit. The percolator with its base section 12 rests removably upon the top of the toaster casing and encloses the heating element 9, with which the bottom of the percolator proper may contact.

This flaring shell construction 12 provides a base of considerable area, to furnish a substantial support for the percolator, while at the same time the heating element 9 is of such size and extent as to apply its heat substantially to the full diameter of the bottom of the percolator. The heat is thus concentrated at the point most effective for heating the percolator. By reason of the protuberant or upwardly extending shell 7 of tapered formation the upper end thereof is of considerably less diameter than the dimension between the opposite lower edges of the downwardly flared base section 12 of the percolator, or considerably less than the diameter of the corresponding frusto-conical portion of said base 12, and thus in placing the percolator in position this upwardly tapered projection acts as a guide in registering the base of the percolator with the toaster unit.

When the percolator is removed the toaster unit may be employed for heating any food such as milk, the heating element 9 serving as a hot plate for heating the milk or other food at the same time that the bread is being toasted.

The assembled device provides for the making of the standard breakfast combination of toast and coffee, and it occupies no more table space than usually is required for the toaster alone, because the percolator surmounts the toaster unit.

In serving, the percolator may be tipped in relation to the toaster casing. In this action the edge of the pendant base portion 12 of the percolator would serve as the pivot point about which the percolator would be turned, and by reason of the fact that this base 12 fits in a depression at the top of the main casing, i. e. formed by the surrounding upstanding rib there will be no danger of the percolator slipping out of place and after serving the percolator when tipped back again to upright position will naturally find its seat without requiring undue care on the part of the person serving the coffee.

While I have shown and described the invention mainly in connection with a percolator and toaster unit, I do not limit myself to this combination which is used as illustrative of my invention, and not restrictive as to its scope which is defined by the accompanying claims.

Neither do I limit myself to the form, dimension, of exact relation of the parts shown. The seat for the utensil, i. e. the percolator in the combination chosen to illustrate the principle of my invention, is below the plane of the upper face of the hot plate and as above stated, the hot plate organization serves to center the utensil in relation to its seat, in placing the utensil in position and with the upstanding rim or flange as for instance at 14 defines the limits of said seat.

Since the heat element for the percolator is not contained therein and since the percolator vessel may be bodily removed from the stove portion of the apparatus, the construction presents the advantage that the percolator may be washed without liability of damage to the heating means; that is, the percolator vessel is susceptible to cleaning just as is an ordinary coffee pot heated over an open flame.

It will be noticed that the base of the percolator vessel is of rectangular shape and sets in a seat of corresponding shape at the top of the stove element, which seat is defined by the upstanding bead or rim at the top of the base member or toaster casing. This construction centers the percolator relative to the toaster and to the heating element carried at the top of the stove member and insures the maintenance of the percolator member in proper position relative to the toaster and to the toaster drawer for convenient handling of both while on the table.

I claim:

1. An electric cooking stove comprising a toaster unit made up of a casing with a heating element therein, and an opening for the introduction of the toasting utensil, and a heating element surmounting said casing of smaller area than the top of said casing, and supported therefrom, substantially as described.

2. A cooking stove according to claim 1 in which the surmounting heating element has a support flaring outwardly and downwardly to the top of the casing.

3. An electric cooking stove comprising a casing, electric heating means therein, an electric hot plate surmounting the casing, and a support for said hot plate flaring downwardly and outwardly to the top of said casing, said casing having a seat surrounding the base of said flaring support, and adapted to support a removable utensil, and an upstanding rib surrounding said seat, substantially as described.

4. In combination with a casing having an electric heating element therein, a hot plate surmounting said casing, a support for said hot plate flaring downwardly and outwardly from the hot plate to the top of the casing, said casing top having a seat surrounding the base of the said flaring support, and a cooking utensil, having a downwardly and outwardly flaring supporting or base section surrounding the flaring support of the hot plate and resting removably upon the said seat on the top of the casing, the bottom of said utensil lying adjacent the hot plate, substantially as described.

5. In combination a casing, an electric heating element within the casing, said casing having an opening in its side to receive a utensil to be subjected to the heat from said element, a heating element surmounting the casing and of reduced area as compared with the area of the top of the casing, a support for said surmounting heating element supported on the top of the casing, said casing having a seat on its top surrounding said support, and a cooking utensil having a support surrounding the support of the surmounting heating element and resting on said seat removably, the bottom of said utensil lying above and adjacent said surmounting heating element, substantially as described.

6. In combination in an electric cooking stove, a casing having an electric heating element therein, with an opening in said casing for the introduction of a cooking utensil, a heating element or hot plate exposed at the top of said casing, of less diameter than the top of the casing, a seat surrounding said exposed heating element and in a lower plane than the upper face of said exposed heating element, and a cooking utensil having a pendant rim portion surrounding said exposed heating element and resting removably on said seat and with its bottom portion above said hot plate, substantially as described.

7. An electric stove having an interior heating element, and an opening for the introduction of a cooking utensil, an upper hot plate of less area than the stove top, and surrounded by a seat in a plane lower than the upper face of the hot plate for receiving a utensil, substantially as described.

8. A cooking apparatus comprising a casing having an interior electric heating element and an opening for the introduction of a cooking utensil, an upper hot plate, with a seat surrounding the same in a lower plane than the upper face of said plate, and a cooking utensil having a pendant portion surrounding the hot plate and resting on said seat with the bottom of said utensil above said hot plate, substantially as described.

9. In combination a base casing having a depression in its top defined by an upstanding rib or flange, an electric heating element carried by an upwardly protuberant support from said top, said support being flared downwardly, and a utensil having a base flared downwardly and fitted within the rib or flange and adapted to be tipped relative to said base casing, said heating element delivering its heat against the bottom of said utensil, substantially as described.

10. In combination a base having a top of non-circular form with an upstanding flange about its margin, a substantially circular heating element above said top and supported thereon and a utensil of substantially circular form in cross section having a bottom to overlie the said heating element and having a rim portion pendant in relation to said bottom, said rim portion at its lower edge being of non-circular form corresponding to the non-circular form of the flange of the base, and fitting within said flange, substantially as described.

In testimony whereof, I affix my signature.

CHARLES J. GRAYSON.